3,574,151
PROCESS FOR THE PREPARATION OF TRANSPARENT IMPACT-RESISTANT POLYMER COMPOSITIONS
Takeshi Goto, Nikko Danchi, Nikko-cho, Fuchu-shi; Eiji Sakaoka, 48, 2-chome, Seki-machi, Nerima-ku; Michikazu Hiraoka, 261 Hyakunin-cho, Shinjuku-ku; and Shonosuke Rokudo, 588, 3-chome, Nerimune Suginami-ku, all of Tokyo, Japan
No Drawing. Filed Mar. 26, 1968, Ser. No. 715,976
Int. Cl. C08f 19/08
U.S. Cl. 260—4         23 Claims

ABSTRACT OF THE DISCLOSURE

A method for providing a transparent impact-resistant graft polymer of an aromatic vinyl monomer and a rubbery polymer backbone whereby graft polymerization is conducted in the presence of a minor amount of β-bromostyrene and a transparent impact-resistant graft polymer resulting therefrom.

BACKGROUND OF THE INVENTION

The present invention relates to a process for the preparation of transparent impact-resistant polymer compositions and more particularly to a process for preparing transparent impact-resistant graft-polymer compositions containing minor amounts of β-bromostyrene.

It is well known that tough resin compositions can be prepared by graft polymerizing aromatic vinyl monomers onto various rubbery polymers. However, such grafted-polymerized compositions are usually undesirably opaque, and consequently are severely restricted in their extent of usefulness. Although the art has long recognized the need for improved resin compositions, the processes so far developed have not been successful in preparing materials having sufficient transparency, while maintaining a high degree of impact resistance.

SUMMARY OF THE INVENTION

It is therefore an object of this invention to provide a process for preparing a graft-polymerized composition having a high impact resistance and high transparency. Another object of this invention is to provide a process for preparing tough, transparent graft polymerized compositions. A further object of this invention is to provide improved transparent and impact-resistant resin compositions.

These and other objects are provided by the process of grafting an aromatic vinyl monomer, or a mixture of an aromatic vinyl monomer and a copolymerizable monomer, onto a rubbery polymer in the presence of a minor amount of β-bromostyrene.

DETAILED DESCRIPTION OF THE INVENTION

According to this invention, graft polymerization solutions are prepared by dissolving a rubbery polymer in an aromatic vinyl monomer, such as styrene, or a mixture of an aromatic monomer with one or more copolymerizable monomers, and a minor amount of β-bromostyrene. The amount of β-bromostyrene used is preferably within the range of about 0.05 to about 2.0% based on the total weight of the monomer or monomers and the rubbery polymer. Although greater or lesser amounts may be desired for special purposes, when the amount of β-bromostyrene used is less than 0.05% by weight, the resultant polymer composition usually is characterized by insufficient transparency. On the other hand, while slightly greater amounts of β-bromostyrene are not severely detrimental, since there was observed to be very little improvement in characteristics above about 2.0% by weight, the cost of β-bromostyrene would render such greater amounts economically unattractive. Moreover, if the quantity of β-bromostyrene used is substantially higher, the heat stability and light stability of the resultant composition will tend to be adversely affected.

A wide range of rubbery polymers can be used in this invention, as the substrate or backbone polymer. As examples of rubber polymers, there can be mentioned emulsion-polymerized or solution polymerized butadiene-styrene copolymers (containing low or high styrene contents), polybutadiene of the high cis, low cis, trans-cis, or low vinyl types, cis-polyisoprene, butadiene-acrylonitrile copolymers, natural rubber, polychloroprene, and the like, as well as mixtures thereof. The amount of rubbery polymer is preferably from about 2 to 15% by weight based on the total weight of the monomer and polymer. While other proportions of the rubbery polymer can be used, generally if the amount of rubbery polymer is less than 2% by weight, the resulting polymer composition will be characterized by insufficient impact resistance. If the quantity of rubbery polymer is higher than 15% by weight, the melt flow of the resulting composition will tend to be low, making it difficult to subject the polymer composition to working, such as by injection molding.

A wide variety of aromatic vinyl monomers can be used in the graft polymerization of the present process. For example, operable aromatic vinyl monomers include styrene and styrene derivatives such as alpha-alkylstyrenes, mono or dichloro substituted styrenes, and mono or polyalkyl substituted styrenes. Specifically, exemplary of operable styrene derivatives are alpha-methylstyrene, chlorostyrene, 2,4-dichlorostyrene, 2,4-dimethylstyrene, 4-ethylstyrene, 4-methoxystyrene, 4-ethoxystyrene, vinyltoluene, and the like. Various monomers, which are copolymerizable with the aromatic vinyl monomer, can be grafted with the aromatic vinyl monomer onto the rubbery polymer, such as those monomers having a vinylidene group, for example, methylacrylate, ethylacrylate, methylmethacrylate, ethylmethacrylate, acrylonitrile and the like. The optimum quantity of copolymerizable monomers depends upon the particular rubbery polymer and the particular aromatic vinyl monomer used.

Any of the state of the art methods for graft polymerization can be used within the scope of this invention. For example, the monomer or monomer mixture can be grafted by bulk polymerization, suspension polymerization, solution polymerization, bulk-suspension dual polymerization, and the like.

When graft polymerizing by bulk-suspension dual polymerization, it is preferable to polymerize up to 20–40% by weight of the polymerizable material in a first bulk polymerization step and then to polymerize the remaining quantity of polymerizable material in a subsequent suspension polymerization.

The graft polymerization process of this invention may be conducted in the presence of a free radical catalyst such as the monomer soluble organic peroxides, for example benzoyl peroxide, lauroyl peroxide, tert-butylperbenzoate, di-tert-butyl peroxide, dicumyl peroxide, and the like, and mixtures thereof. Such polymerization catalysts can be preferably used in the amount of from about 0.01 to about 0.5% by weight based on the total weight of the monomer and the rubbery polymer.

The temperature of graft polymerization depends upon the particular catalysts and the particular polymerization system employed, but good results are obtainable when graft polymeriaztion is carried out at a temperature of from 70 to 150° C. in a step cycle.

A great variety of additives can be used within the scope of this invention. For example, additives normally employed for preparing impact-resistant polystyrene, such as chain transfer agents, plasticizers, antioxidants, and the like, are operable herein. Although the exact mechanism is not fully understood as to why the incorporation of β-bromostyrene provides such a remarkable improvement in the transparency of impact-resistant polymer compositions, it is clear that the addition of β-bromostyrene to the graft polymerization process does provide a high degree of transparency. It is believed, however, that the mechanism is somehow related to the ability of β-bromostyrene to act as a chain transfer agent. In fact, this characteristic of β-bromostyrene eliminates the need to use other chain transfer agents such as tert-dodecylmercaptan which are usually used in the preparation of impact-resistant polystyrene. Combination of such extraneous chain transfer agents and β-bromostyrene has a further benefit of increasing the workability of the polymer.

The invention will now be explained by reference to the following examples, which are presented for illustration only and are not intended to be limiting in any manner. Reference to parts in the examples is intended to mean parts by weight unless otherwise indicated.

EXAMPLE 1

In a reactor equipped with a suitable stirrer, a thermometer, and a reflux condenser, 7 parts of a styrene-butadiene copolymer prepared by an emulsion polymerization (a polymer containing 23% by weight styrene; sold under the trade name of Ameripoly 1006 by Goodrich Chem. Co.) was dissolved in 93 parts of a styrene monomer. To the solution were added 0.1 part of β-bromostyrene, 3 parts of butylbenzyl phthalate as plasticizer, and a mixture of 0.1 part of tert-dibutylperbenzoate and 0.2 part of dicumyl peroxide as a catalyst. The resulting mixture was subjected to suspension polymerization in 200 parts of water having dissolved therein 0.1 part of polyvinyl alcohol (88% hydrolyzed, polymerization degree 1700) as a dispersing agent.

The polymerization system was heated with stirring for 30 minutes at 90° C., for one hour at 100° C., for 5 hours at 110° C., for 2 hours at 130° C., and finally for one hour at 135° C. to complete the polymerization. After the reaction was finished, the product was filtered, washed by water and then dried to provide polymer beads. When the polymer composition thus produced was subjected to injection molding, the results were as follows:

Impact strength (notched): 1.12 ft. lb./inch
Tensile strength: 5250 p.s.i.
Elongation: 55%
Melt flow (190° C.): 0.3 g./10 min.
Heat distortion temperature: 83° C.
Haze: 26%

EXAMPLE 2

The same polymerization as in Example 1 was repeated under substantially the same conditions except that the amount of β-bromostyrene was changed to 1.0 part. The physical properties of the polymer composition thus prepared are almost the same as those in Example 1, except the following properties:

Impact strength (notched): 1.03 ft. lb./inch
Melt flow (190° C.): 1.0 g./10 min.
Haze: 22%

EXAMPLE 3

In a reactor the same as used in Example 1, 5 parts of polybutadiene rubber prepared by a solution polymerization (cis-1,4 unit content 36%, sold under the trade name of Diene 55 NF by Asahi Kasei Kogyo K.K.) was dissolved in 95 parts of a styrene monomer. To the solution were added 0.5 part of β-bromostyrene, 3 parts of butylbenzyl phthalate, and 0.05 part of dicumyl peroxide as a catalyst. The mixture was heated with stirring to 110° C. and when the monomer reached 30% conversion, the system was cooled. Thereafter, 0.2 part of dicumyl peroxide was added as a catalyst to the system, the resulting mixture was dispersed in 200 parts of an aqueous solution containing 0.1 part of polyvinyl alcohol (88% hydrolyzed, polymerization degree 1700) as a dispersing agent, and the dispersion was polymerized for 4.5 hours at 115° C. and then for 3 hours at 130° C. After the polymerization was finished, the product was filtered, washed and dried to provide polymer beads. The polymer composition thus obtained was subjected to injection molding and the physical properties of the product were measured, the results of which were as follows:

Impact strength (notched): 1.04 ft. lb./inch
Tensile strength: 5100 p.s.i.
Elongation: 60%
Melt flow (190° C.): 0.8 g./10 min.
Haze: 20%

EXAMPLE 4

The same procedure was repeated as in Example 3, under substantially same conditions as those in the example except that 0.1 part of tert-dodecylmercaptan was used additionally. The polymer composition prepared had substantially the same physical properties as those in Example 3, except that the melt flow of the instant polymer was 1.6 g./10 min. (190°), which was about twice as large as that of the polymer in Example 3.

EXAMPLE 5

The same procedure as in Example 3 was repeated under substantially the same conditions as those in the example except that 0.1 part of tert-dodecylmercaptan was additionally added and 50 parts of styrene and 45 parts of methyl methacrylate were used as monomer compositions instead of the styrene monomer. The physical properties of the polymer composition thus obtained were as follows:

Impact strength: 1.12 ft. lb./inch
Tensile strength: 4950 p.s.i.
Elongation: 86%
Melt flow (190° C.): 0.9 g./10 min.
Haze: 16%

EXAMPLE 6

The same procedure as in Example 3 was repeated under substantially the same conditions as those in the example except that 0.1 part of tert-dodecylmercaptan was additionally added as a chain transfer agent and 72 parts of styrene and 23 parts of acrylonitrile were employed as the monomer composition, instead of 95 parts of styrene. The physical properties of the polymer composition thus prepared were as follows:

Impact strength (notched): 0.94 ft. lb./inch
Tensile strength: 4850 p.s.i.
Elongation: 82%
Melt flow (190° C.): 0.7 g./10 min.
Haze: 22%

EXAMPLE 7

For comparison, the procedure as in Example 4 was repeated under substantially the same conditions as those in the example without employing β-bromostyrene. The polymer composition prepared was white and opaque and had a haze of higher than 95% and a melt flow (190° C.) of 1.1 g./10 min., which showed lower workability.

EXAMPLE 8

For comparison, the procedure as in Example 5 was repeated under substantially the same conditions as those in the example without employing β-bromostyrene. The polymer composition prepared has a haze of 57% and a melt flow of 0.5 g./10 min., which showed the polymer having reduced properties as compared with those in Example 5.

EXAMPLE 9

The same procedure as in Example 5 was repeated under substantially the same conditions as those in the example except using 5 parts of a high cis-type polybutadiene prepared by solution polymerization (cis-1, 4 unit content 98%, trade name Nipol 1202 manufactured by the Nippon Zeon Co.) as the rubbery polymer. The physical properties of the polymer composition prepared were as follows:

Impact strength: 1.15 ft. lb./inch
Tensile strength: 5010 p.s.i.
Elongation: 88%
Melt flow (190° C.): 0.9 g./10 min.
Haze: 13%

EXAMPLE 10

In the same reactor as in Example 1, 6.5 parts of a styrenebutadiene copolymer prepared by solution polymerization (styrene content 25%, trade name Tafdene 2000A manufactured by the Asahi Kasei Kogyo K.K.) was dissolved in a mixture of 40 parts of a styrene monomer and 53.5 parts of a methylmethacrylate monomer. After adding to the solution 0.5 part of β-bromostyrene, 3 parts of butylbenzyl phthalate, 0.1 part of tert-dodecylmercaptan, and 0.05 part of dicumyl peroxide, the same procedure as in Example 3 was repeated. The results were as follows:

Impact strength (notched): 1.01 ft. lb./inch
Tensile strength: 4950 p.s.i.
Elongation: 70%
Melt flow (190° C.): 1.4 g./10 min.
Heat distortion temperature: 85%
Haze: 2.5%

EXAMPLE 11

In the same reactor as in Example 1, 6.5 parts of a styrenebutadiene copolymer prepared by solution polymerization (styrene content 25%, trade name Tafdene 2000A manufactured by the Asaji Kasei Kogyo K.K.) was dissolved in a mixture of 37.5 parts of a styrene monomer, 46.5 parts of methylmethacrylate and 9.5 parts of acrylonitrile The same procedure as in Example 3 was repeated. The results were as follows:

Impact strength: 1.08 ft. lb./inch
Tensile strength: 5250 p.s.i.
Elongation: 68%
Melt flow (190° C.): 1.1 g./10 min.
Haze: 5.8%

In addition, in the examples shown above the impact strength (ft. lb./inch) was measured by ASTMD–256, the tensile strength (p.s.i.) and the elongation (percent) by ASTMD–638, the heat distortion temperature (° C.) by ASTMD–648, and the haze by ASTMD–1003.

What is claimed is:

1. A process for the preparation of a transparent impact-resistant polymer which comprises dissolving a rubbery diolefin polymer in an aromatic vinyl monomer to yield a solution adding to the solution from about 0.05 to about 2.0% by weight of β-bromostyrene, based on the total weight of the rubbery diolefin polymer and monomer, and polymerizing the resulting solution.

2. The process of claim 1 wherein said polymerization is a bulk-suspension dual polymerization in which the solution is polymerized up to from about 20 to 40% by bulk polymerization in a first step and is polymerized to completion by suspension polymerization in a second step.

3. A process for the preparation of a transparent impact-resistant polymer which comprises dissolving a rubbery diolefin polymer in a mixture of an aromatic vinyl monomer with at least one other monomer copolymerizable with said vinyl monomer to yield a solution, adding to the solution from about 0.05 to about 2.0% by weight of β-bromostyrene, based on the total weight of the rubbery diolefin polymer and monomers, and subjecting the resulting solution to a polymerization.

4. The process of claim 1 wherein from about 2 to about 15% of the rubbery diolefin polymer is dissolved in the aromatic vinyl monomer.

5. The process of claim 3 wherein from about 2 to about 15% of the rubbery diolefin polymer is dissolved in the mixture of an aromatic vinyl monomer with at least one other monomer copolymerizable with the aromatic vinyl monomer.

6. The process of claim 3 wherein said polymerization is a bulk-suspension dual polymerization in which the solution is polymerized up to from about 20 to 40% by bulk polymerization in a first step and is polymerized to completion by suspension polymerization in a second step.

7. The process of claim 1 wherein said aromatic vinyl monomer is styrene.

8. The process of claim 3 wherein said aromatic vinyl monomer is styrene.

9. The process of claim 3 wherein said vinyl aromatic monomer is styrene and said monomer copolymerizable therewith is methyl methacrylate.

10. The process of claim 3 wherein said vinyl aromatic monomer is styrene and said monomer copolymerizable therewith is acrylonitrile.

11. The process of claim 3 wherein said vinyl aromatic monomer is styrene and said monomer copolymerizable therewith comprises a mixture of methyl methacrylate and acrylonitrile.

12. The process of claim 1 wherein said polymerization is conducted in the presence of a free radical catalyst.

13. The process of claim 3 wherein said polymerization is conducted in the presence of a free radical catalyst.

14. The process of claim 1 wherein the polymerization is conducted at a temperature of 70 to 150° C.

15. The process of claim 3 wherein the polymerization is conducted at a temperature of 70 to 150° C.

16. A transparent impact-resistant polymer prepared by dissolving a rubbery diolefin polymer in an aromatic vinyl monomer to yield a solution, adding from about 0.05 to about 2.0% of β-bromostyrene based on the total weight of the rubbery diolefin polymer and monomer to the solution, and polymerizing the resulting solution.

17. The polymer according to claim 16 wherein the amount of said rubbery polymer is from 2 to 15% by weight based on the total weight of the rubbery polymer and the monomer.

18. The polymer according to claim 16 wherein said aromatic vinyl monomer is styrene.

19. A transparent impact-resistant polymer prepared by dissolving a rubbery diolefin polymer in a mixture of an aromatic vinyl monomer and at least one other monomer copolymerizable with said vinyl monomer to yield a solution, adding from 0.05 to about 2.0% of β-bromostyrene based on the total weight of the rubbery diolefin polymer and monomer to the solution, and polymerizing the resultant solution.

20. The polymer according to claim 19 wherein the amount of said rubbery polymer is from 2 to 15% by weight based on the total weight of the rubbery polymer and the monomer.

21. The polymer of claim 16 wherein said vinyl aromatic monomer is styrene and said monomer copolymerizable therewith is methyl methacrylate.

22. The polymer of claim 16 wherein said vinyl aromatic monomer is styrene and said monomer copolymerizable therewith is acrylonitrile.

23. The polymer of claim 16 wherein said vinyl aromatic monomer is styrene and said monomer copolymerizable therewith comprises a mixture of methyl methacrylate and acrylonitrile.

References Cited
UNITED STATES PATENTS

| | | | |
|---|---|---|---|
| 2,398,736 | 4/1946 | Dreisbach | 260—87.5 |
| 3,267,180 | 8/1966 | Ayres et al. | 260—880 |
| 3,311,675 | 3/1967 | Doak et al. | 260—880 |

MURRAY TILLMAN, Primary Examiner

M. J. TULLY, Assistant Examiner

U.S. Cl. X.R.

260—880